United States Patent [19]

Ogata et al.

[11] Patent Number: 4,772,106
[45] Date of Patent: Sep. 20, 1988

[54] COMPACT ZOOM LENS SYSTEM

[75] Inventors: Yasuzi Ogata; Tatsuo Inabata, both of Tokyo, Japan

[73] Assignee: Olympus Optical Co., Ltd., Tokyo, Japan

[21] Appl. No.: 41,744

[22] Filed: Apr. 23, 1987

[30] Foreign Application Priority Data

Apr. 25, 1986 [JP] Japan ................... 61-94409

[51] Int. Cl.$^4$ ............ G02B 15/14; G02B 13/18
[52] U.S. Cl. .................. 350/427; 350/423; 350/432
[58] Field of Search ............ 350/423, 432–435, 350/427

[56] References Cited

U.S. PATENT DOCUMENTS

| 4,659,186 | 4/1987 | Sato et al. | 350/427 |
| 4,679,913 | 7/1987 | Sato et al. | 350/423 |
| 4,682,860 | 7/1987 | Tanaka et al. | 350/423 |
| 4,720,179 | 1/1988 | Ito | 350/423 |

FOREIGN PATENT DOCUMENTS

57-201213  12/1982  Japan .

Primary Examiner—John K. Corbin
Assistant Examiner—Scott J. Sugarman
Attorney, Agent, or Firm—Cushman, Darby & Cushman

[57] ABSTRACT

A compact zoom lens system comprising a first lens group having positive refractive power, a stop, and a second lens group having negative refractive power in the order from the object side wherein the first lens group comprises at least two positive lenses and at least one negative lens, and the second lens group comprises a positive lens and a negative lens and which is arranged to be zoomed by varying the airspace between the first and second lens groups, the compact zoom lens system being arranged to have the desired back focal length and a short overall length and being arranged that aberrations are corrected favorably, the compact zoom lens system being thereby arranged to be the most suitable for the use with a camera with a lens shutter.

11 Claims, 10 Drawing Sheets

COMPACT ZOOM LENS SYSTEM

BACKGROUND OF THE INVENTION (a) Field of the Invention

The present invention relates to a compact zoom lens system and, more particularly, to a compact zoom lens system to be used with a camera with a lens shutter.

(b) Description of the Prior Art

A zoom lens system, which comprises a first lens group having negative refractive power and a second lens group having positive refractive power and which is arranged to be zoomed by varying the airspace between said lens groups, is known as a zoom lens system to be used chiefly with a single-lens reflex camera.

As the above-mentioned type of zoom lens system comprises a negative lens group and a positive lens group in the order from the object side, the principal point thereof comes to a position near the image surface and, therefore, the back focal length is long. This means that it is easy to ensure a space for accommodating a quick return mirror, and this is advantageous when uning said type of zoom lens system with a single-lens reflex camera. However, as the overall length of the lens system becomes long, said type of zoom lens system is not suitable for the use with a camera with a lens shutter and the like which requires compactness of a lens system.

The zoom lens system disclosed by Japanese published unexamined patent application No. 201213/82 is known as a zoom lens system which is arranged to be small in size to the degree that said lens system can be assembled in a camera with a lens shutter. Said known zoom lens system comprises a first lens group having positive refractive power and a second lens group having negative refractive power and is arranged to be zoomed by varying the airspace between said lens groups. Said known zoom lens system is arranged to make the overall length thereof short by adopting the so-called telephoto type lens composition. However, said known zoom lens system has disadvantages as described below. That is, as the diameter of the rearmost lens is large, the camera body as a whole tends to become large when the lens moving mechanism is included. Moreover, as the back focal length is too short, the quality of image tends to become unfavourable because of dirt on the rearmost lens surface.

SUMMARY OF THE INVENTION

It is, therefore, a primary object of the present invention to provide a compact zoom lens system which is arranged that a required back focal length is ensured, the overall length of the lens system is short, and the diameter of the lens system is small and, at the same time, which is arranged to have a zoom ratio about 1.5 and favourable performance, said compact zoom lens system being thereby arranged to be the most suitable for the use with a camera with a lens shutter.

The compact zoom lens system according to the present invention comprises a first lens group having positive refractive power, a stop, and a second lens group having negative refractive power, and is arranged to be zoomed by varying the airspace between said first and second lens groups.

When arranging the above-mentioned type of zoom lens system that the exit pupil thereof comes to a positon near the image surface so as to thereby make the back focal length long, it is necessary to make the negative refractive power of the second lens group strong. However, when the refractive power of the second lens group is made strong, aberrations to be caused by the second lens group become large, and it is impossible to correct aberrations of the lens system as a whole favourably.

The compact zoom lens system according to the present invention is arranged to make the lens system small in size and, at the same time, to correct aberrations favourably by arranging that the second lens group comprises a positive lens and a negative lens. That is, the compact zoom lens system according to the present invention is arrange that the first lens group comprises at least two positive lenses and at least one negative lens, and the second lens group comprises a positive lens and a negative lens, said compact zoom lens system being thereby arranged to make it possible to attain the object of the present invention.

When the compact zoom lens system according to the present invention is arranged to fulfill the conditions (1) through (4) shown below, it is possible to make the lens system still smaller in size and to correct aberrations favouraly:

(1) $0.5 < f_1/f_w < 1.0$
(2) $0.6 < |f_2|/f_w < 1.4$, $f_2 < 0$
(3) $0 < D_w/f_w < 0.5$
(4) $0.1 < P_w/f_w < 0.5$ where, reference symbols $f_1$ and $f_2$ respectively represent focal lengths of the first lens group and second lens group, reference sysbol $f_w$ represents the focal length of the lens system as a whole in the wide position, reference symbol $D_w$ represents the airspace between the first lens group and second lens group in the wide position, and reference symbol $P_w$ represents the distance from the exit pupil to the rearmost surface of the lens system in the wide position.

Now, respective conditions shown in the above are described below.

If the value of the focal length $f_1$ of the first lens group is made large to the degree that $f_1/f_w$ becomes larger than the upper limit of the condition (1), the overall length of the lens system become long. Moreover, when focusing is to be performed by moving the first lens group, the advancing amount of the first lens group becomes large. As a result, the diameter of the front lens becomes large, and this is not desirable. When $f_1$ is made small to the degree that $f_1/f_w$ becomes smaller than the lower limit of the condition (1), it is advantageous for making the lens system compact. However, aberrations to be caused by the first lens group become large and, especially, it becomes difficult to correct pincushion type distortion in the wide position.

If $|f_2|$ is made large to the degree that $|f_2|/f_w$ becomes larger than the upper limit of the condition (2), the distance between the exit pupil and image surface becomes long. As a result, the lens system as a whole becomes large, and this is contrary to the object of the present invention. If $|f_2|$ is made small to the degree that $|f_2|/f_w$ becomes smaller than the lower limit of the conditon (2), Petzval's sum becomes small, and curvature of field becomes unfavourable.

If the airspace $D_w$ is made large to the degree that $D_w/f_w$ becomes larger than the upper limit of the condition (3), the distance between the exit pupil and image surface becomes long. As a result, the lens system as a whole becomes large, and this is not desirable. If the airspace $D_w$ is made small to the degree that $D_w/f_w$ becomes smaller than the lower limit of the condition (3), the refractive powers of the first and second lens groups should be made strong in order to ensure the desired zoom ratio. Consequently, the value of the focal length $f_1$ of the first lens group becomes small to the degree that $f_1/f_w$ becomes smaller than the lower limit of the condition (1). As a result, aberrations become large and, especially, it becomes difficult to correct pincushion type distortion in the wide position as described before. In the same way as above, the absolute value $|f_2|$ of the focal length of the second lens group becomes small to the degree that $|f_2|/f_w$ becomes smaller than the lower limit of the condition (2). As a result, Petzval's sum becomes small, and curvature of field become unfavourable.

The condition (4) defines the position of the exit pupil in the wide position. If the value of $P_w/f_w$ becomes larger than the upper limit of the condition (4), the diameter of the second lens group becomes large, and this is contrary to the object of the present invention, i.e., to make the lens system small in size. If the value of $P_w/f_w$ becomes smaller than the lower limit of the condition (4), the refracitive power of the second lens group becomes too strong, and $|f_2|$ becomes small to the degree that $|f_2|/f_w$ becomes smaller than the lower limit of the condition (2). Consequently, Petzval's sum becomes small, and curvature of field becomes unfavourable. When the upper limit of the condition (4) is defined as 0.35 instead of 0.5, it is possible to make the lens system still smaller in size and to make the performance thereof favourable.

When the zoom lens system according to the present invention is arranged to fulfill the conditions (1) through (4) described so far, it is possible to make the lens system small in size. Besides, when the negative lens constituting the second lens group is arranged as a biconcave lens, the principal point of the second lens group comes to a position near the image surface, and it is possible to obtain a zoom lens system which is still smaller in size and whose aberrations are corrected favourably.

Furthermore, when the compact zoom lens system according to the present invention is arranged to further fulfill the conditions (5) through (8) shown below, it is possible to obtain a zoom lens system whose aberrations are corrected more favourably:

(5) $0.1 < d/f_1 < 0.5$
(6) $0.1 < r_a/f_1 < 0.7$
(7) $0.1 < |r_b|/f_1 < 1.0$, $r_b < 0$
(8) $0.2 r_c/f_2 < 0.7$, $r_c < 0$ where, reference symbol d represents the sum of thicknesses of positive lenses arranged between the negative lens in the first lens group and stop, reference symbol $r_a$ represents the radius of curvature of the surface on the image side of the negative lens in the first lens group, reference symbol $r_b$ represents the radius of curvature of the rearmost surface of the first lens group, and reference symbol $r_c$ represents the radius of curvature of the surface on the object side of the negative lens in the second lens group.

The condition (5) is established in order to correct curvature of field. When the value of $d/f_1$ becomes larger than the upper limit of the condition (5), it is advantageous for correction of aberrations. However, the overall length of the lens system becomes long. When the value of $d/f_1$ becomes smaller than the lower limit of the condition (5), the variation of curvature of field to be caused by the variation of the image height becomes too large.

The conditions (6) and (7) are established in order to correct the variation of aberrations to be caused at the time of zooming. When the value of $r_a/f_1$ becomes larger than the upper limit of the condition (6) or the value of $|r_b|/f_1$ becomes smaller than the lower limit of the condition (7), spherical aberration and curvature of field will be undercorrected. When the value of $r_a/f_1$ becomes smaller than the lower limit of the condition (6) or the value of $|r_b|/f_1$ becomes larger than the upper limit of the condition (7), spherical aberration and curvature of field will be overcorrected. When the value of $r_c/f_2$ becomes larger than the upper limit of the condition (8), curvature of field will be undercorrected. When the value of $r_c/f_2$ becomes smaller than the lower limit of the condition (8), pincushion type distortion becomes too large in the wide position.

Furthermore, when an aspherical surface expressed by the formula shown below is provided in the first lens group or second lens group as illustrated by Embodiments 4 and 5 shown later, it is possible to correct aberrations, especially, curvature of field and coma more favourably:

$$x = \frac{y^2/r}{1 + \sqrt{1 - (y/r)^2}} + By^2 + Ey^4 + Fy^6 + Gy^8 + Hy^{10}$$

where, reference symbols x and y respectively represent values of coordinates in the coordinate system where the optical axis is traced as the x axis and the y axis is traced perpendicularly to the x axis taking the intersecting point between the aspherical surface and optical axis as the origin, reference symbol r represents the radius of curvature of the vertex portion of the aspherical surface, and reference symbols B, E, F, G, H, . . . respectively represent the coefficients of aspherical surface of the second order, fourth order, sixth order, eighth order, tenth order and so on.

DETAILED DESCRIPTION OF THE PREFERRED EMBODIMENTS

Now, the preferred embodiments of the compact zoom lens system according to the present invention described so far are shown below.

Embodiment 1
$f = 41.2 \sim 58.2$, F/4.6~F/6.6

$r_1 = 13.086$
$d_1 = 4.19$ $\quad n_1 = 1.66680 \quad \nu_1 = 33.04$
$r_2 = 61.292$
$d_2 = 1.66$
$r_3 = -62.003$
$d_3 = 1.20$ $\quad n_2 = 1.84666 \quad \nu_2 = 23.78$
$r_4 = 9.800$
$d_4 = 2.95$
$r_5 = 18.293$
$d_5 = 9.83$ $\quad n_3 = 1.62004 \quad \nu_3 = 36.25$
$r_6 = -15.273$
$d_6 = 2.00$
$r_7 = \infty$ (stop)
$d_7 = D$
$r_8 = 206.959$
$d_8 = 2.93$ $\quad n_4 = 1.51823 \quad \nu_4 = 58.96$
$r_9 = -28.114$
$d_9 = 2.89$
$r_{10} = -18.949$
$d_{10} = 1.40$ $\quad n_5 = 1.83400 \quad \nu_5 = 37.16$
$r_{11} = 157.752$
$D = 11.510 \sim 2.500$
$f_1/f_w = 0.78$, $|f_2|/f_w = 0.96$
$D_w/f_w = 0.28$, $P_w/f_w = 0.269$
$d/f_1 = 0.31$, $r_a/f_1 = 0.30$
$r_b/f_1 = -0.47$, $r_c/f_2 = 0.48$ Embodiment 2
$f = 41.2 \sim 58.2$, F/4.6~F/6.6

$r_1 = 14.909$
$d_1 = 4.20$ $\quad n_1 = 1.73520 \quad \nu_1 = 41.08$
$r_2 = 48.227$
$d_2 = 1.66$
$r_3 = -35.192$
$d_3 = 1.00$ $\quad n_2 = 1.80518 \quad \nu_2 = 25.43$
$r_4 = 15.566$
$d_4 = 3.56$
$r_5 = 48.548$
$d_5 = 2.40$ $\quad n_3 = 1.56732 \quad \nu_3 = 42.83$
$r_6 = -65.407$
$d_6 = 0.15$
$r_7 = 47.955$
$d_7 = 3.00$ $\quad n_4 = 1.59270 \quad \nu_4 = 35.29$
$r_8 = -20.866$
$d_8 = 2.00$
$r_9 = \infty$ (stop)
$d_9 = D$
$r_{10} = -620.617$
$d_{10} = 2.96$ $\quad n_5 = 1.53172 \quad \nu_5 = 48.90$
$r_{11} = -21.732$
$d_{11} = 2.44$
$r_{12} = -16.588$
$d_{12} = 1.10$ $\quad n_6 = 1.83400 \quad \nu_6 = 37.16$
$r_{13} = 1107.775$
$D = 11.678 \sim 2.353$
$f_1/f_w = 0.78$, $|f_2|/f_w = 0.99$
$D_w/f_w = 0.28$, $P_w/f_w = 0.269$
$d/f_1 = 0.17$, $r_a/f_1 = 0.48$
$r_b/f_1 = -.065$, $r_c/f_2 = 0.41$ Embodiment 3
$f = 41.2 \sim 58.2$, F/4.6~F/6.6

$r_1 = 13.269$
$d_1 = 4.50$ $\quad n_1 = 1.72825 \quad \nu_1 = 28.46$
$r_2 = 46.496$
$d_2 = 1.34$
$r_3 = -111.600$
$d_3 = 1.00$ $\quad n_2 = 1.80518 \quad \nu_2 = 25.43$
$r_4 = 8.804$
$d_4 = 3.15$
$r_5 = 16.153$
$d_5 = 10.39$ $\quad n_3 = 1.54739 \quad \nu_3 = 53.55$ -continued $r_6 = -13.748$
$d_6 = 1.50$
$r_7 = \infty$ (stop)
$d_7 = D$
$r_8 = -89.808$
$d_8 = 3.00$ $\quad n_4 = 1.63980 \quad \nu_4 = 34.48$
$r_9 = -23.296$
$d_9 = 3.13$
$r_{10} = -16.391$
$d_{10} = 1.10$ $\quad n_5 = 1.83400 \quad \nu_5 = 37.16$
$r_{11} = -644.321$
$D = 11.762 \sim 3.263$
$f_1/f_w = 0.77$, $|f_2|/f_w = 0.92$
$D_w/f_w = 0.29$, $P_w/f_w = 0.274$
$d/f_1 = 0.33$, $r_a/f_1 = 0.42$
$r_b/f_1 = -0.44$, $r_c/f_2 = 0.43$ Embodiment 4
$f = 41.2 \sim 58.2$, F/4.6~F/6.6

$r_1 = 14.129$
$d_1 = 4.16$ $\quad n_1 = 1.61293 \quad \nu_1 = 37.00$
$r_2 = 72.611$
$d_2 = 1.51$
$r_3 = -42.509$
$d_3 = 1.79$ $\quad n_2 = 1.80518 \quad \nu_2 = 25.43$
$r_4 = 13.287$
$d_4 = 1.71$
$r_5 = 23.101$
$d_5 = 11.48$ $\quad n_3 = 1.72342 \quad \nu_3 = 37.95$
$r_6 = -20.449$
$d_6 = 0.71$
$r_7 = \infty$ (stop)
$d_7 = D$
$r_8 = 33.696$
$d_8 = 3.20$ $\quad n_4 = 1.49109 \quad \nu_4 = 57.00$
$r_9 = -32.105$ (aspherical surface)
$d_9 = 2.73$
$r_{10} = -18.890$
$d_{10} = 1.00$ $\quad n_5 = 1.81600 \quad \nu_5 = 46.62$
$r_{11} = 52.554$
$D = 11.389 \sim 0.658$
$f_1/f_w = 0.84$, $|f_2|/f_w = 1.06$
$D_w/f_w = 0.28$, $P_w/f_w = 0.249$
$d/f_1 = 0.33$, $r_a/f_1 = 0.38$
$r_b/f_1 = -0.59$, $r_c/f_2 = 0.43$
aspherical surface coefficients
$B = 0$, $E = -0.22901 \times 10^{-4}$,
$F = -0.55448 \times 10^{-7}$, $G = -0.14686 \times 10^{-8}$
$H = 0.16617 \times 10^{-10}$ Embodiment 5
$f = 41.2 \sim 58.2$, F/4.6~F/6.6

$r_1 = 15.546$
$d_1 = 4.85$ $\quad n_1 = 1.70154 \quad \nu_1 = 41.24$
$r_2 = 66.673$
$d_2 = 1.66$
$r_3 = -54.063$
$d_3 = 1.36$ $\quad n_2 = 1.80518 \quad \nu_2 = 25.43$
$r_4 = 14.903$ (aspherical surface)
$d_4 = 3.96$
$r_5 = 26.300$
$d_5 = 6.11$ $\quad n_3 = 1.59551 \quad \nu_3 = 39.21$
$r_6 = -17.395$
$d_6 = 1.50$
$r_7 = \infty$ (stop)
$d_7 = D$
$r_8 = -385.202$
$d_8 = 2.00$ $\quad n_4 = 1.51742 \quad \nu_4 = 52.41$
$r_9 = -24.449$
$d_9 = 2.89$
$r_{10} = -18.103$
$d_{10} = 1.00$ $\quad n_5 = 1.79952 \quad \nu_5 = 42.24$
$r_{11} = 1094.867$
$D = 11.207 \sim 0.839$
$f_1/f_w = 0.80$, $|f_2|/f_w = 1.08$
$D_w/f_w = 0.27$, $P_w/f_w = 0.265$
$d/f_1 = 0.19$, $r_a/f_1 = 0.45$
$r_b/f_1 = -0.53$, $r_c/f_2 = 0.41$
aspherical surface coefficients
$B = 0$, $E = 0.26854 \times 10^{-4}$
$F = 0.45187 \times 10^{-6}$, $G = 0.92832 \times 10^{-8}$
$H = -0.14695 \times 10^{-9}$ In respective embodiments shown in the above, reference symbols $r_1, r_2, \ldots$ respectively represent radii of curvature of respective lens surfaces, reference symbols $d_1, d_2, \ldots$ respectively represent thicknesses of respective lenses and airspaces between respective lenses, reference symbols $n_1, n_2, \ldots$ respectively represent refractive indices of respective lenses, and reference symbols $\nu_1, \nu_2, \ldots$ respectively represent Abbe's numbers of respective lenses.

Figure 1:
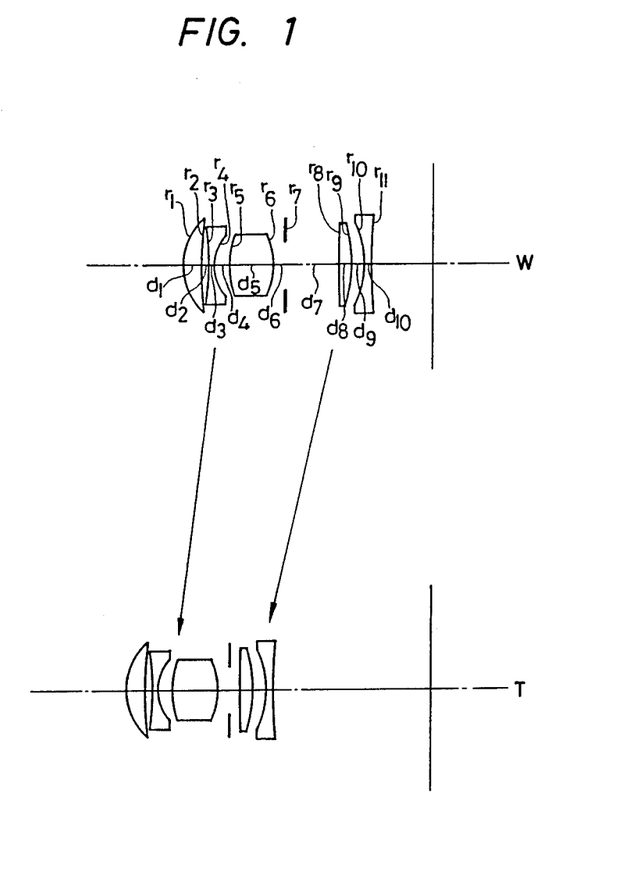
FIG. 1 shows a sectional view of Embodiments 1, 3, 4 and 5 of the compact zoom lens system according to the present invention.
Figure 3:
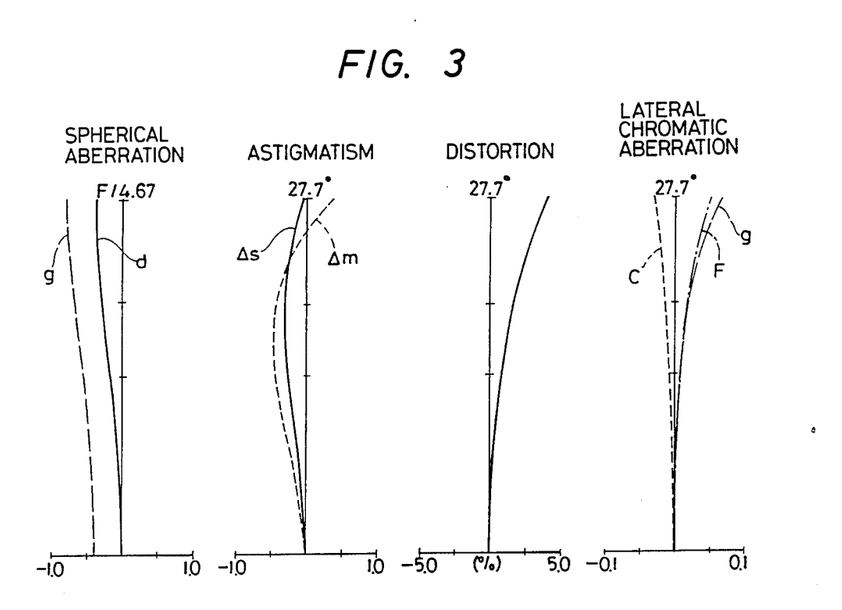
FIGS. 3, 4 and 5 respectively show graphs illustrating aberration curves of Embodiment 1 of the present invention.
Figure 4:
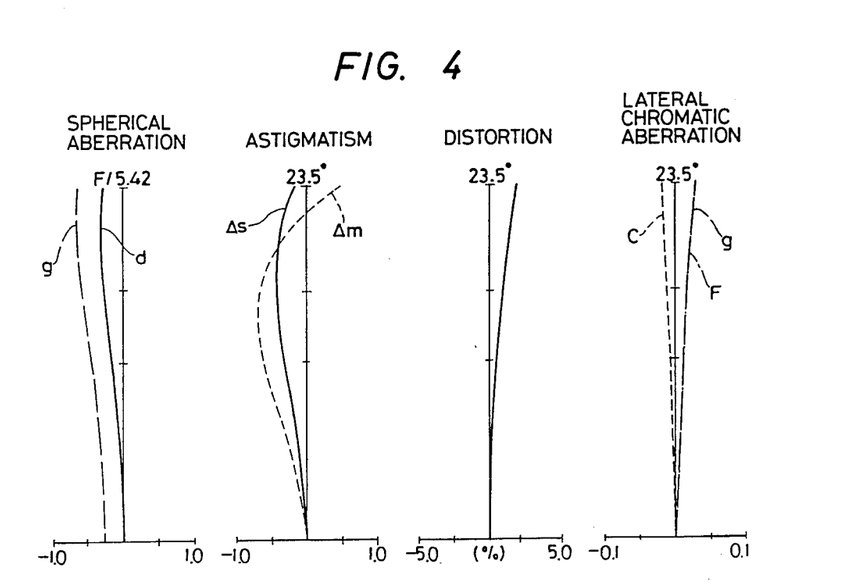
Figure 5:
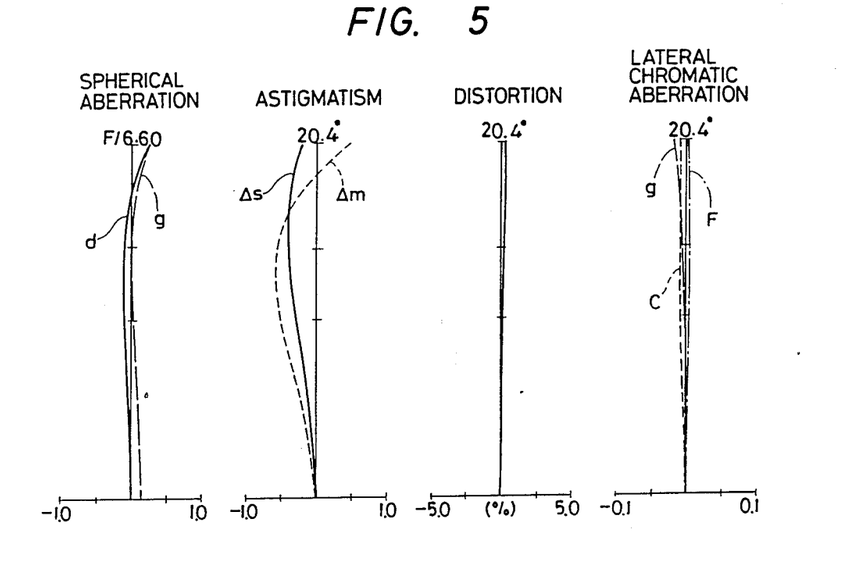

Out of respective embodiments shown in the above, Embodiment 1 has the lens configuration as shown in FIG. 1. That is, the first lens group comprises a positive lens, a negative lens and a positive lens, and the second lens group comprises a positive lens and a negative lens. Aberration curves of said Embodiment 1 in the wide position, standard position and teleposition are as shown in FIGS. 3, 4 and 5 respectively.

Figure 2:
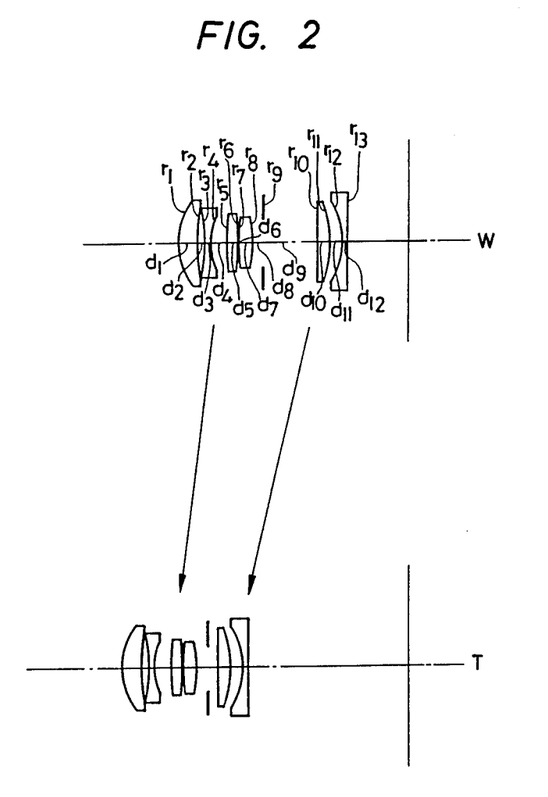
FIG. 2 shows a sectional view of Embodiment 2 of the compact zoom lens system according to the present invention.
Figure 6:
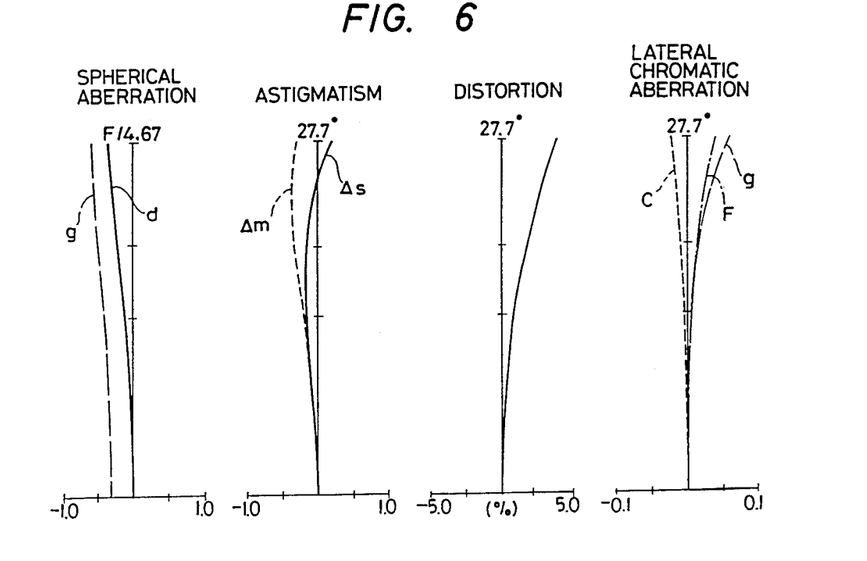
FIGS. 6, 7 and 8 respectively show graphs illustrating aberration curves of Embodiment 2 of the present invention.
Figure 7:
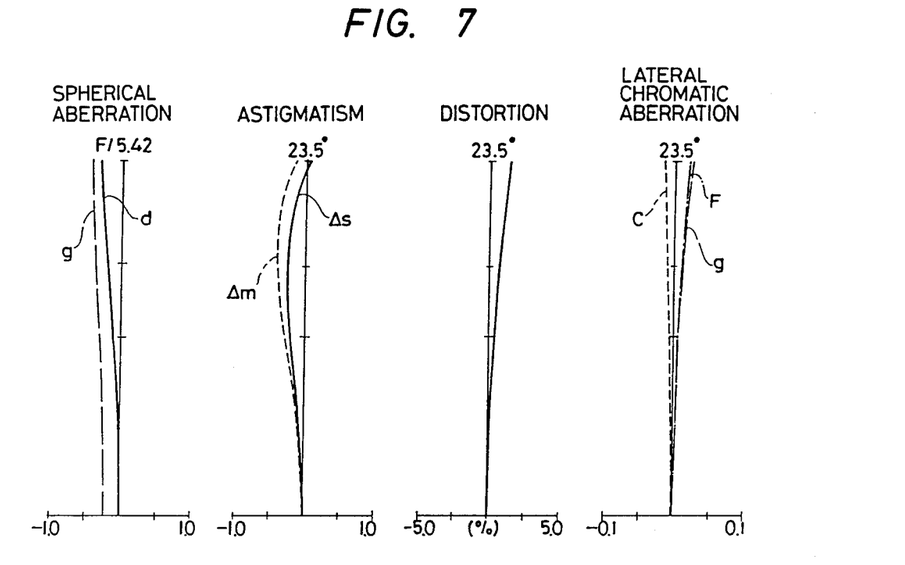
Figure 8:
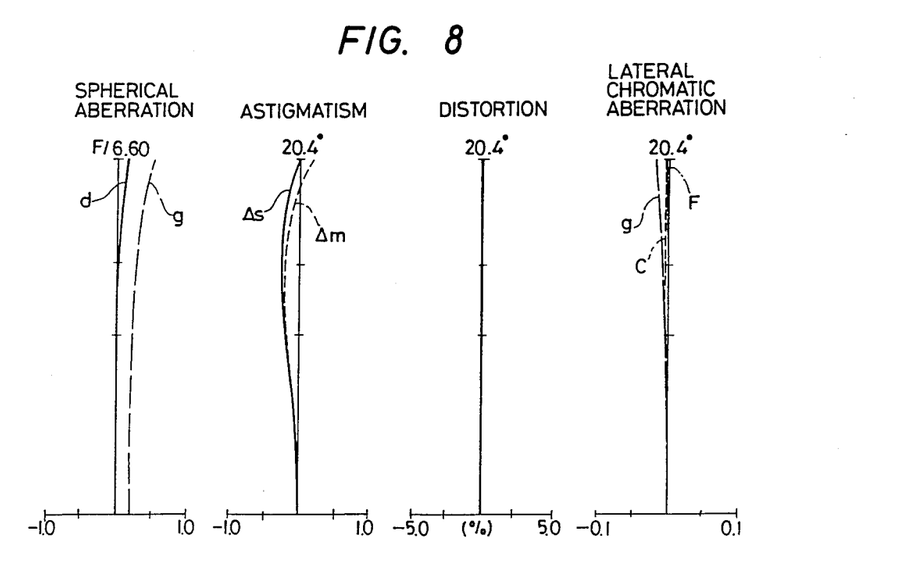

Embodiment 2 has the lens configuration as shown in FIG. 2. That is, the first lens group comprises a positive lens, a negative lens, a positive lens and a positive lens, and the second lens group comprises a positive lens and a negative lens. Aberration curves of said Embodiment 2 in the wide position, standard position and teleposition are as shown in FIGS. 6, 7 and 8 respectively.

Figure 9:
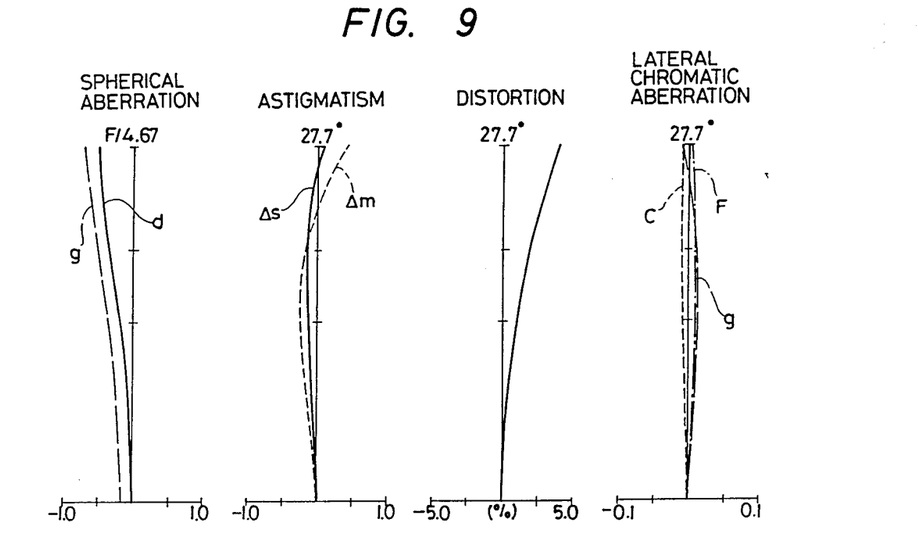
FIGS. 9, 10 and 11 respectively show graphs illustrating aberration curves of Embodiment 3 of the present invention.
Figure 10:
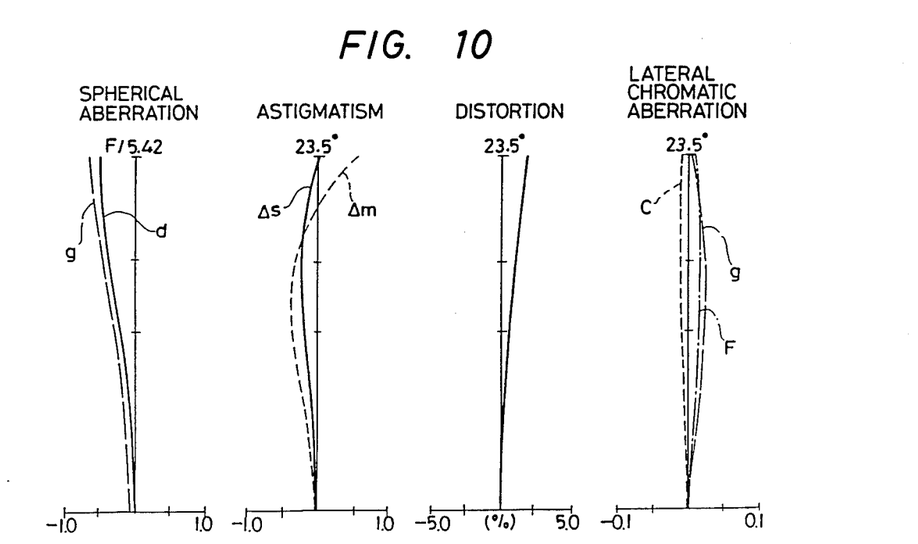
Figure 11:
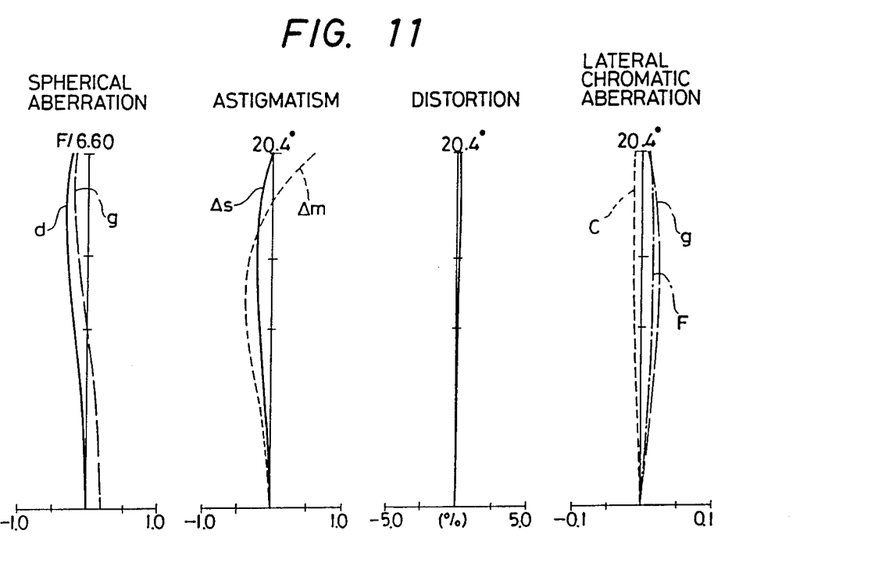

Embodiment 3 has the lens configuration as shown in FIG. 1, and aberration curves of Embodiment 3 in the wide position, standard position and teleposition are as shown in FIGS. 9, 10 and 11 respectively.

Figure 12:
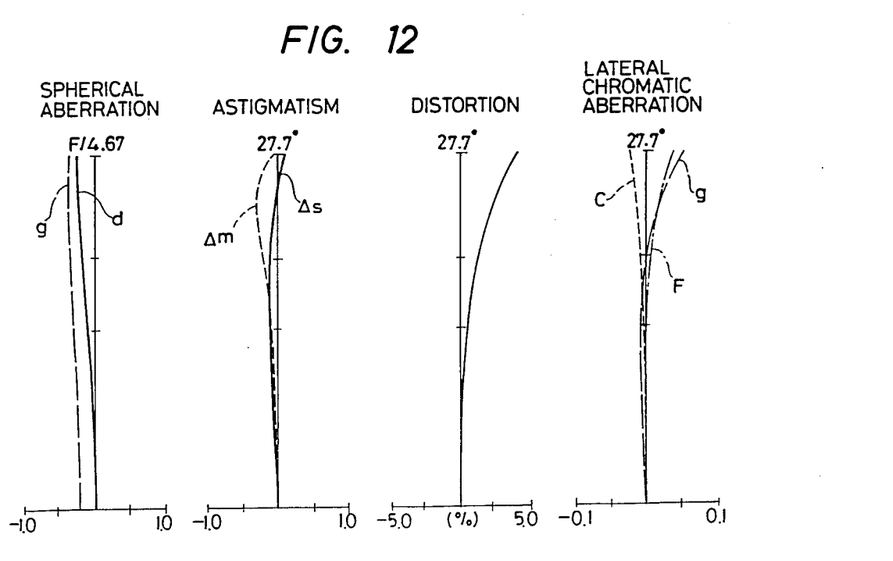
FIGS. 12, 13 and 14 respectively show graphs illustrating aberration curves of Embodiment 4 of the present invention.
Figure 13:
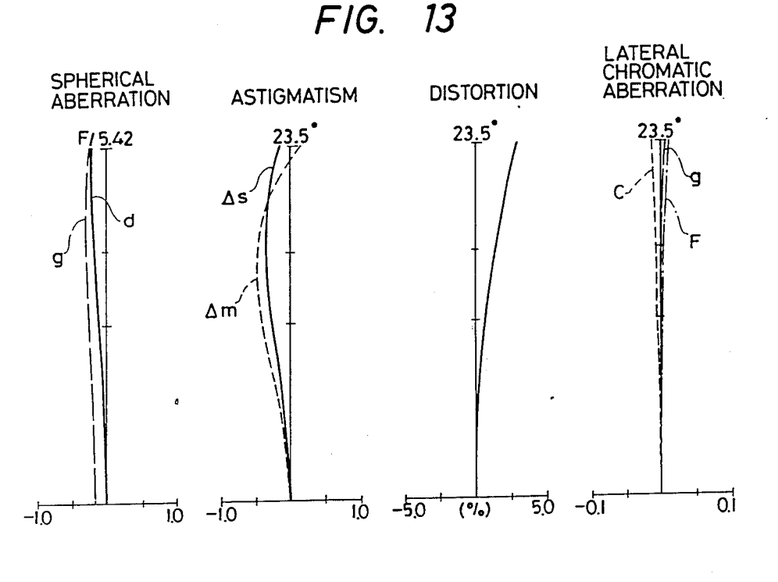
Figure 14:
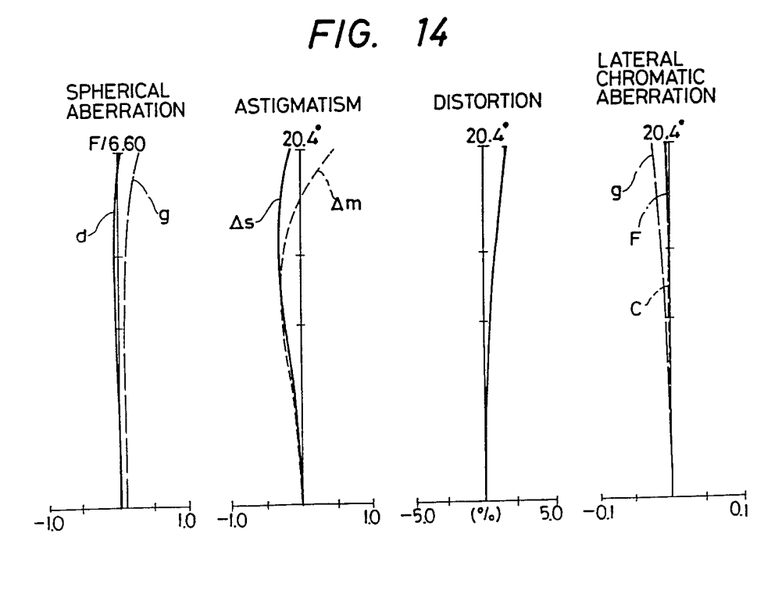

Embodiment 4 has the lens configuration as shown in FIG. 1, and the ninth surface ($r_9$) thereof is arranged as an aspherical surface. Aberration curves of Embodiment 4 in the wide position, standard position and teleposition are as shown in FIGS. 12, 13 and 14 respectively.

Figure 15:
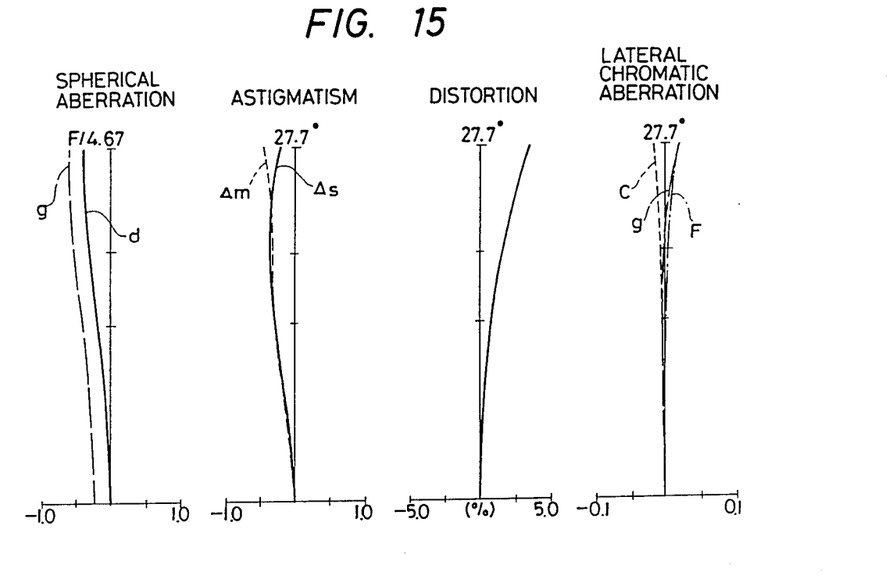
FIGS. 15, 16 and 17 respectively show graphs illustrating aberration curves of Embodiment 5 of the present invention.
Figure 16:
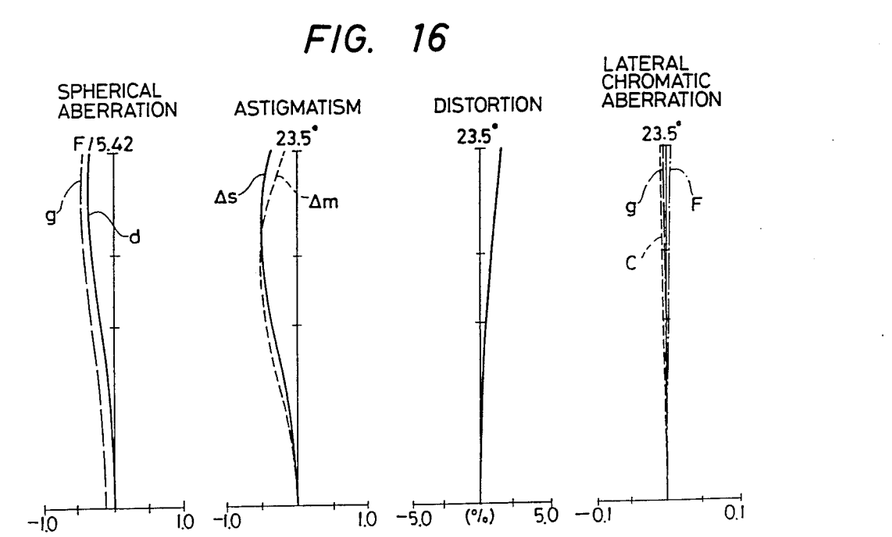
Figure 17:
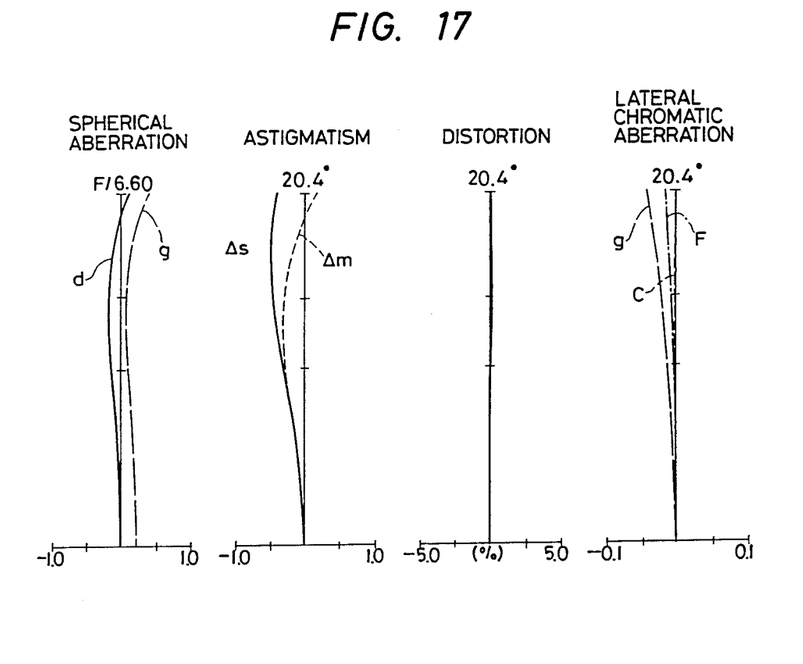

Embodiment 5 has the lens configuration as shown in FIG. 1, and the fourth surface ($r_4$) thereof is arranged as an aspherical surface. The radius of curvature of the vertex portion of said fourth surface (aspherical surface) corresponds to the radius of curvature $r_a$ defined by the condition (6). Aberration curves of Embodiment 5 in the wide position, standard position and teleposition are as shown in FIGS. 15, 16 and 17 respectively.

As described so far, the zoom lens system according to the present invention is arranged as a compact zoom lens system whose overall length is short and outer diameter is small and, at the same time, arranged that the performance thereof is favourable, said compact zoom lens system being the most suitable for the use with a camera with a lens shutter.

We claim:

1. A compact zoom lens system comprising a first lens group having positive refractive power and a second lens group having negative refractive power in the order from the object side wherein said first lens group comprises at least two positive lenses and at least one negative lens, and said second lens group comprises a positive lens and a negative lens in the order from the object side, said compact zoom lens system being arranged to be zoomed by varying the airspace between said first lens group and said second lens group, said compact zoom lens system being further arranged to fulfill the conditions (1) through (4) shown below:

(1) $0.5 < f_1/f_w < 1.0$
(2) $0.6 < |f_2|/f_w < 1.4$, $f_2 < 0$
(3) $0 < D_w/f_w < 0.5$
(4) $0.1 < P_w/f_w < 0.5$ where, reference symbols $f_1$ and $f_2$ respectively represent focal lengths of the first lens group and second lens group, reference symbol $f_w$ represents the focal length of the lens system as a whole in the wide position, reference symbol $D_w$ represents the airspace between the first lens group and second lens group in the wide position, and reference symbol $P_w$ represents the distance from the exit pupil to the rearmost surface of the lens system in the wide position.

2. A compact zoom lens system according to claim 1 wherein said first lens group is provided with an aspherical surface expressed by the formula shown below:

$$x = \frac{y^2/r}{1 + \sqrt{1 - (y/r)^2}} + By^2 + Ey^4 + Fy^6 + Gy^8 + Hy^{10}$$

where, reference symbols x and y respectively represent values of coordinates in the coordinate system where the optical axis is traced as the x axis and the y axis is traced perpendicularly to the x axis taking the intersecting point between the aspherical surface and optical axis as the origin, reference symbol r represents the radius of curvature of the vertex portion of the aspherical surface, and reference symbols B, E, F, G, H, . . . respectively represent the coefficients of aspherical surface of the second order, fourth order, sixth order, eighth order, tenth order and so on.

3. A compact zoom lens system according to claim 1 wherein said second lens group is provided with an aspherical surface expressed by the formula shown below:

$$x = \frac{y^2/r}{1 + \sqrt{1 - (y/r)^2}} + By^2 + Ey^4 + Fy^6 + Gy^8 + Hy^{10}$$

where, reference symbols x and y respectively represent values of coordinates in the coordinate system where the optical axis is traced as the x axis and the y axis is traced perpendicularly to the x axis taking the intersecting point between the aspherical surface and optical axis as the origin, reference symbol r represents the radius of curvature of the vertex portion of the aspherical surface, and reference symbols B, E, F, G, H, . . . respectively represent the coefficients of aspherical surface of the second order, fourth order, sixth order, eighth order, tenth order and so on.

4. A compact zoom lens system according to claim 1 further fulfilling the conditions (5) through (8) shown below:

(5) $0.1 < d/f_1 < 0.5$
(6) $0.1 < r_a/f_1 < 0.7$
(7) $0.1 < |r_b|/f_1 < 1.0$, $r_b < 0$
(8) $0.2 < r_c/f_2 < 0.7$, $r_c < 0$ where, reference symbol d represents the sum of thicknesses of positive lenses arranged between the negative lens in the first lens group and stop, reference symbol $r_a$ represents the radius of curvature of the surface on the image side of the negative lens in the first lens group, reference symbol $r_b$ represents the radius of curvature of the rearmost surface of the first lens group, and reference symbol $r_c$ represents the radius of curvature of the surface on the object side of the negative lens in the second lens group.

5. A compact zoom lens system according to claim 2 further fulfilling the conditions (5) through (8) shown below:

(5) $0.1 < d/f_1 < 0.5$
(6) $0.1 < r_a/f_1 < 0.7$
(7) $0.1 < |r_b|/f_1 < 1.0$, $r_b < 0$
(8) $0.2 < r_c/f_2 < 0.7$, $r_c < 0$ where, reference symbol d represents the sum of thicknesses of positive lenses arranged between the negative lens in the first lens group and stop, reference symbol $r_a$ represents the radius of curvature of the surface on the image side of the negative lens in the first lens group, reference symbol $r_b$ represents the radius of curvature of the rearmost surface of the first lens group, and reference symbol $r_c$ represents the radius of curvature of the surface on the object side of the negative lens in the second lens group.

6. A compact zoom lens system according to claim 3 further fulfilling the conditions (5) through (8) shown below:

(5) $0.1 < d/f_1 < 0.5$
(6) $0.1 < r_a/f_1 < 0.7$
(7) $0.1 < |r_b|/f_1 < 1.0$, $r_b < 0$
(8) $0.2 < r_c/f_2 < 0.7$ $r_c < 0$

Where, reference symbol d represents the sum of thicknesses of positive lenses arranged between the negative lens in the first lens group and stop, reference symbol $r_a$ represents the radius of curvature of the surface on the image side of the negative lens in the first lens group, reference symbol $r_b$ represents the radius of curvature of the rearmost surface of the first lens group, and reference symbol $r_c$ represents the radius of curvature of the surface on the object side of the negative lens in the second lens group.

7. A compact zoom lens system according to claim 4 wherein said first lens group comprises a positive lens, a negative lens and a positive lens in the order from the object side, said compact zoom lens system having the following numerical data:

| $f = 41.2 \sim 58.2$, F/4.6~F/6.6 | | |
|---|---|---|
| $r_1 = 13.086$ | | |
| $d_1 = 41.9$ | $n_1 = 1.66680$ | $v_1 = 33.04$ |
| $r_2 = 61.292$ | | |
| $d_2 = 1.66$ | | |
| $r_3 = -62.003$ | | |
| $d_3 = 1.20$ | $n_2 = 1.84666$ | $v_2 = 23.78$ |
| $r_4 = 9.800$ | | |
| $d_4 = 2.95$ | | |
| $r_5 = 18.293$ | | |
| $d_5 = 9.83$ | $n_3 = 1.62004$ | $v_3 = 36.25$ |
| $r_6 = -15.273$ | | |
| $d_6 = 2.00$ | | |
| $r_7 = \infty$ (stop) | | |
| $d_7 = D$ | | |
| $r_8 = 206.959$ | | |
| $d_8 = 2.93$ | $n_4 = 1.51823$ | $v_4 = 58.96$ |
| $r_9 = -28.114$ | | |
| $d_9 = 2.89$ | | |
| $r_{10} = -18.949$ | | |
| $d_{10} = 1.40$ | $n_5 = 1.83400$ | $v_5 = 37.16$ |
| $r_{11} = 157.752$ | | |
| $D = 11.510 \sim 2.500$ | | |
| $f_1/f_w = 0.78$, $|f_2|/f_w = 0.96$ | | |
| $D_w/f_w = 0.28$, $P_w/f_w = 0.269$ | | |
| $d/f_1 = 0.31$, $r_a/f_1 = 0.30$ | | |
| $r_b/f_1 = -0.47$, $r_c/f_2 = 0.48$ | | | where, reference symbols $r_1$, $r_2$, . . . respectively represent radii of curvature of respective lens surfaces, reference symbols $d_1$, $d_2$, . . . respectively represet thicknesses of respective lenses and airspaces between respective lenses, reference symbol $n_1$, $n_2$, . . . respectively represent refractive indices of respective lenses and reference symbols $v_1$, $v_2$, . . . respectively represent Abbe's numbers of respective lenses.

8. A compact zoom lens system according to claim 4 wherein said first lens group comprises a positive lens, a negative lens, positive lens and a positive lens in the order from the object side, said compact zoom lens system having the following numerical data:

| $f = 41.2 \sim 58.2$, F/4.6~F/6.6 | | |
|---|---|---|
| $r_1 = 14.909$ | | |
| $d_1 = 4.20$ | $n_1 = 1.73520$ | $v_1 = 41.08$ |
| $r_2 = 48.227$ | | |
| $d_2 = 1.66$ | | |
| $r_3 = -35.192$ | | |
| $d_3 = 1.00$ | $n_2 = 1.80518$ | $v_2 = 25.43$ |
| $r_4 = 15.566$ | | |
| $d_4 = 3.56$ | | |
| $r_5 = 48.548$ | | |
| $d_5 = 2.40$ | $n_3 = 1.56732$ | $v_3 = 42.83$ |
| $r_6 = -65.407$ | | |
| $d_6 = 0.15$ | | |
| $r_7 = 47.955$ | | |
| $d_7 = 3.00$ | $n_4 = 1.59270$ | $v_4 = 35.29$ |
| $r_8 = -20.866$ | | |
| $d_8 = 2.00$ | | |
| $r_9 = \infty$ (stop) | | |
| $d_9 = D$ | | |
| $r_{10} = -620.617$ | | |
| $d_{10} = 2.96$ | $n_5 = 1.53172$ | $v_5 = 48.90$ |
| $r_{11} = 21.732$ | | |
| $d_{11} = 2.44$ | | |
| $r_{12} = -16.588$ | | |
| $d_{12} = 1.10$ | $n_6 = 1.83400$ | $v_6 = 37.16$ |
| $r_{13} = 1107.775$ | | |
| $D = 11.678 \sim 2.353$ | | |
| $f_1/f_w = 0.78$, $|f_2|/f_w = 0.99$ | | |
| $D_w/f_w = 0.28$, $P_w/f_w = 0.269$ | | |
| $d/f_1 = 0.17$, $r_a/f_1 = 0.48$ | | |
| $r_b/f_1 = -0.65$, $r_c/f_2 = 0.41$ | | | where, reference symbols $r_1$, $r_2$, . . . respectively represent radii of ourvature of respective lens surfaces, reference symbols $d_1$, $d_2$, . . . respectively represet thicknesses of respective lenses and airspace between respective lenses, reference symbols $n_1$, $n_2$, . . . respectively represent refractive indices of respective lenses, and reference symbols $v_1$, $v_2$, . . . respectively represent Abbe's numbers of respective lenses.

9. A compact zoom lens system according to claim 4 wherein said first lens group comprises a positive lens, a negative lens and a positive lens in the order from the object side, said compact zoom lens system having the following numerical data:

| $f = 41.2 \sim 58.2$, F/4.6~F/6.6 | | |
|---|---|---|
| $r_1 = 13.269$ | | |
| $d_1 = 4.50$ | $n_1 = 1.72825$ | $v_1 = 28.46$ |
| $r_2 = 46.496$ | | |
| $d_2 = 1.34$ | | |
| $r_3 = -111.600$ | | |
| $d_3 = 1.00$ | $n_2 = 1.80518$ | $v_2 = 25.43$ |
| $r_4 = 8.804$ | | |
| $d_4 = 3.15$ | | |
| $r_5 = 16.153$ | | |
| $d_5 = 10.39$ | $n_3 = 1.54739$ | $v_3 = 53.55$ |
| $r_6 = -13.748$ | | |
| $d_6 = 1.50$ | | |
| $r_7 = \infty$ (stop) | | |
| $d_7 = D$ | | |
| $r_8 = -89.808$ | | |
| $d_8 = 3.00$ | $n_4 = 1.63980$ | $v_4 = 34.48$ |
| $r_9 = -23.296$ | | |

-continued

| $f = 41.2 \sim 58.2, F/4.6 \sim F/6.6$ | | |
|---|---|---|
| $d_9 = 3.13$ | | |
| $r_{10} = -16.391$ | | |
| $d_{10} = 1.10$ | $n_5 = 1.83400$ | $\nu_5 = 37.16$ |
| $r_{11} = -644.321$ | | |
| $D = 11.762 \sim 3.263$ | | |
| $f_1/f_w = 0.77, |f_2|/f_w = 0.92$ | | |
| $D_w/f_w = 0.29, P_w/f_w = 0.274$ | | |
| $d/f_1 = 0.33, r_a/f_1 = 0.42$ | | |
| $r_b/f_1 = -0.44, r_c/f_2 = 0.43$ | | | where, reference symbols $r_1, r_2, \ldots$ respectively represent radii of curvature of respective lens surfaces, reference symbols $d_1, d_2, \ldots$ respectively represent thicknesses of respective lenses and airspaces between respective lenses, reference symbols $n_1, n_2, \ldots$ respectively represent refractive indices of respective lenses, and reference symbols $\nu_1, \nu_2, \ldots$ respectively represent Abbe's numbers of respective lenses.

10. A compact zoom lens system according to claim 6 wherein said first lens group comprises a positive lens, a negative lens and a positive lens in the order from the object side, said compact zoom lens system having the following numerical data:

| $f = 41.2 \sim 58.2, F/4.6 \sim F/6.6$ | | |
|---|---|---|
| $r_1 = 14.129$ | | |
| $d_1 = 4.16$ | $n_1 = 1.61293$ | $\nu_1 = 37.00$ |
| $r_2 = 72.611$ | | |
| $d_2 = 1.51$ | | |
| $r_3 = -42.509$ | | |
| $d_3 = 1.79$ | $n_2 = 1.80518$ | $\nu_2 = 25.43$ |
| $r_4 = 13.287$ | | |
| $d_4 = 1.71$ | | |
| $r_5 = 23.101$ | | |
| $d_5 = 11.48$ | $n_3 = 1.72342$ | $\nu_3 = 37.95$ |
| $r_6 = -20.449$ | | |
| $d_6 = 0.71$ | | |
| $r_7 = \infty$ (stop) | | |
| $d_7 = D$ | | |
| $r_8 = 33.696$ | | |
| $d_8 = 3.20$ | $n_4 = 1.49109$ | $\nu_4 = 57.00$ |
| $r_9 = -32.105$ (aspherical surface) | | |
| $d_9 = 2.73$ | | |
| $r_{10} = -18.890$ | | |
| $d_{10} = 1.00$ | $n_5 = 1.81600$ | $\nu_5 = 46.62$ |
| $r_{11} = 52.554$ | | |
| $D = 11.389 \sim 0.658$ | | |
| $f_1/f_w = 0.84, |f_2|/f_w = 1.06$ | | |
| $D_w/f_w = 0.28, P_w/f_w = 0.249$ | | |
| $d/f_1 = 0.33, r_a/f_1 = 0.38$ | | |
| $r_b/f_1 = -0.59, r_c/f_2 = 0.43$ | | |
| aspherical surface coefficients | | |
| $B = 0, E = -0.22901 \times 10^{-4}$ | | |
| $F = -0.55448 \times 10^{-7}, G = -0.14686 \times 10^{-8}$ | | |

-continued

| $f = 41.2 \sim 58.2, F/4.6 \sim F/6.6$ |
|---|
| $H = 0.16617 \times 10^{-10}$ | where, reference symbols $r_1, r_2, \ldots$ respectively represent radii of curvature of respective lens surfaces, reference symbols $d_1, d_2, \ldots$ respectively represent thicknesses of respective lenses and airspaces between respective lenses, reference symbols $n_1, n_2, \ldots$ respectively represent refractive indices of respective lenses, and reference symbols $\nu_1, \nu_2, \ldots$ respectively represent Abbe's numbers of respective lenses.

11. A compact zoom lens system according to claim 5 wherein said first lens group comprises a positive lens, a negative lens and a positive lens in the order from the object side, said compact zoom lens system having the following numerical data:

| $f = 41.2 \sim 58.2, F/4.6 \sim F/6.6$ | | |
|---|---|---|
| $r_1 = 15.546$ | | |
| $d_1 = 4.85$ | $n_1 = 1.70154$ | $\nu_1 = 41.24$ |
| $r_2 = 66.673$ | | |
| $d_2 = 1.66$ | | |
| $r_3 = -54.063$ | | |
| $d_3 = 1.36$ | $n_2 = 1.80518$ | $\nu_2 = 25.43$ |
| $r_4 = 14.903$ (aspherical surface) | | |
| $d_4 = 3.96$ | | |
| $r_5 = 26.300$ | | |
| $d_5 = 6.11$ | $n_3 = 1.59551$ | $\nu_3 = 39.21$ |
| $r_6 = -17.395$ | | |
| $d_6 = 1.50$ | | |
| $r_7 = \infty$ (stop) | | |
| $d_7 = D$ | | |
| $r_8 = -385.202$ | | |
| $d_8 = 2.00$ | $n_4 = 1.51742$ | $\nu_4 = 52.41$ |
| $r_9 = -24.449$ | | |
| $d_9 = 2.89$ | | |
| $r_{10} = -18.103$ | | |
| $d_{10} = 1.00$ | $n_5 = 1.79952$ | $\nu_5 = 42.24$ |
| $r_{11} = 1094.867$ | | |
| $D = 11.207 \sim 0.839$ | | |
| $f_1/f_w = 0.80, |f_2|/f_w = 1.08$ | | |
| $D_w/f_w = 0.27, P_w/f_w = 0.265$ | | |
| $d/f_1 = 0.19, r_a/f_1 = 0.45$ | | |
| $r_b/f_1 = -0.53, r_c/f_2 = 0.41$ | | |
| aspherical surface coefficients | | |
| $B = 0, E = -0.26854 \times 10^{-4}$ | | |
| $F = 0.45187 \times 10^{-6}, G = 0.92832 \times 10^{-8}$ | | |
| $H = -0.14695 \times 10^{-9}$ | | | where, reference symbols $r_1, r_2, \ldots$ respectively represent radii of curvature of respective lens surfaces, reference symbols $d_1, d_2, \ldots$ respectively represent thicknesses of respective lenses and airspaces between respective lenses, reference symbols $n_1, n_2, \ldots$ respectively represent refractive indices of respective lenses, and reference symbols $\nu_1, \nu_2, \ldots$ respectively represent Abbe's numbers of respective lenses.

* * * * *